Patented May 16, 1944

2,349,136

UNITED STATES PATENT OFFICE 2,349,136

POLYMERIZATION OF VINYL AROMATIC COMPOUNDS

Edgar C. Britton and Walter J. Le Fevre, Midland, Mich., assignors to The Dow Chemical Company, Midland, Mich., a corporation of Michigan No Drawing. Application April 18, 1942, Serial No. 439,564

10 Claims. (Cl. 260—91)

This invention concerns a method and agent for polymerizing vinyl aromatic compounds to produce polymers of abnormally low molecular weight.

It is well known that the physical and mechanical properties of vinyl aromatic resins are dependent in part upon the molecular weight of the resin and that the molecular weight of the resin is in turn determined by the conditions under which the polymerization reaction to form the resin is carried out. In some instances, e. g. for the preparation of molded articles, the tougher resins having a molecular weight of say 70,000 or higher are preferred, whereas for other purposes, e. g. as ingredients of lacquers or varnishes, vinyl aromatic resins of lower molecular weight are often desired. It is known that in preparing such resin the molecular weight of the product may be lowered by raising the temperature at which the polymerization is carried out, by employing peroxides, acids, or other catalysts to increase the rate of the polymerization reaction, or by carrying the reaction out in the presence of a solvent for the reacting material. The first two of these usual conditions for depressing the molecular weight of the product are often undesirable, since they involve a considerable increase in the rate of the strongly exothermic polymerization reaction and may result in the reaction occurring violently and/or in the formation of a discolored product of non-uniform quality. Dilution of the reaction mixture with a solvent usually causes both a considerable reduction in the rate of reaction and lowering of the average molecular weight of the product. In most instances the proportion of solvent required to reduce the molecular weight of the product, e. g. to one-half of that of the product obtained in the absence of the solvent under otherwise similar conditions, is quite large and adds considerably to the cost of the operation.

We have discovered that mesityl oxide influences the reaction for the polymerization of vinyl aromatic compounds, or for the co-polymerization of such compounds with other unsaturated organic compounds, in unusual manner. Its effect in causing a reduction in the average molecular weight of the polymeric product is far greater than that of most organic solvents and is apparently a catalytic effect instead of being the mere dilution effect of most solvents. The presence of one per cent by weight or less of mesityl oxide during the polymerization of styrene is sufficient to cause the polystyrene product to be of markedly lower molecular weight than is polystyrene prepared in the absence of mesityl oxide under otherwise similar conditions. The effect of mesityl oxide in causing a reduction in the molecular weight of the product becomes more pronounced as the proportion thereof in the reaction mixture is increased from a trace, e. g. 0.5 per cent or less, to about 15 per cent by weight. Further increases in the proportion of mesityl oxide may cause a further lowering of the molecular weight of the polymer which is formed, but this effect becomes less pronounced as the proportion of mesityl oxide is increased, e. g. from 15 per cent to 50 per cent of the weight of the mixture. The reduction in the rate of the polymerization reaction due to dilution of the vinyl aromatic compound with mesityl oxide is usually no greater, and in fact appears to be somewhat less, than occurs when the vinyl aromatic compound is diluted with a like proportion of other organic solvents, e. g. benzene, toluene, or ethylbenzene, etc.

Examples of vinyl aromatic compounds which may be polymerized in the presence of mesityl oxide to obtain polymers of lowered molecular weight are styrene, ortho-methyl-styrene, para-methyl-styrene, meta-ethyl-styrene, para-isopropyl-styrene, ortho-chloro-styrene, para-chloro-styrene, divinylbenzene, vinyl-naphthalene, etc. Mesityl oxide, when present during the polymerization, is also effective in causing a reduction in the average molecular weight of the products obtained by co-polymerizing vinyl aromatic compounds with one another or with other unsaturated organic compounds such as methylmethacrylate, ethyl acrylate, divinyl maleate, or butadiene, etc.

Except for the requirement that mesityl oxide be present, the polymerization or co-polymerization of such compounds may be carried out in any of the usual ways, e. g. by polymerizing the compounds in the presence of the mesityl oxide only, or in the presence of other organic solvents or diluents such as benzene, ethylbenzene, etc., or in aqueous emulsion. Catalysts for promoting the rate of polymerization, such as hydrogen peroxide, benzoyl peroxide or mineral acids, etc., may be present if desired and when present may further depress the molecular weight of the polymeric product, but the presence of such catalyst is not required.

The mesityl oxide is effective in causing a lowering of the molecular weight of the polymeric product regardless of the proportion in which it is used, and, as hereinbefore mentioned, the amount by which the molecular weight of the product is lowered increases quite sharply as the proportion of mesityl oxide is increased from a trace to about 15 per cent by weight. Thus, under otherwise uniform reaction conditions, the molecular weight of the product may be predetermined by the proportion of mesityl oxide added. In practice we usually employ between 0.5 and 50 per cent and preferably between 10 and 40 per cent of mesityl oxide, based on the combined weight of the latter and the compound or compounds to be polymerized, but the mesityl oxide may be used in larger proportion if desired. The mesityl oxide is usually added before effecting the polymerization, but there are instances in which a mixture of a polymer of high molecular weight and the corresponding polymer of relatively low molecular weight is desired and in such instances mesityl oxide may advantageously be added during the polymerization reaction.

The polymeric product is often obtained in a form suitable for direct employment for the intended purpose, but when necessary it is further treated as usual to obtain the same in the desired form. For instance, when the polymerization has been carried out en masse or in solution, the mesityl oxide and any other organic liquids are usually vaporized from the product and the latter is crushed, cut or otherwise shaped into pieces of suitable size and shape. When the polymerization has been carried out in aqueous emulsion, the product is coagulated in any of the usual ways, e. g. by strong heating or cooling of the emulsion or by adding any of a variety of agents such as sodium chloride, acids, etc., which are capable of causing coagulation, and the product is separated from the liquor, washed and dried.

The following examples describe certain ways in which the principle of the invention has been applied, but are not to be construed as limiting its scope.

EXAMPLE 1

In each of three experiments either styrene alone or a mixture of styrene and mesityl oxide was heated at a temperature of 100° to 110° C. for 66 hours to effect polymerization. The product was then purified by dissolving it in benzene, precipitating it from the solution by admixing the latter with ethyl alcohol, separating the precipitated polymer and evaporating occluded liquor therefrom. The molecular weight of each polymeric product was measured by the well known Staudinger viscosity method. The following table gives the composition of material subjected to polymerization in each experiment and the molecular weight of the polymerized product.

Table I

| Run No. | Starting materials | | Molecular weight of product |
|---|---|---|---|
| | Styrene | Mesityl oxide | |
| | Per cent by weight | Per cent by weight | |
| 1 | 100 | 0 | 110,000 |
| 2 | 99 | 1 | 99,000 |
| 3 | 90 | 10 | 72,000 |

EXAMPLE 2

A series of experiments similar to those described in Example 1 were carried out for purpose of comparing the effectiveness of mesityl oxide in promoting the formation of polystyrene of low molecular weight with that of other organic liquids such as are sometimes used as mediums in carrying out such polymerization. Table II names the ingredients of the material subjected to the polymerization and gives the per cent by weight of each. It also gives the yield of polystyrene as per cent of the weight of the styrene initially employed and the average molecular weight of the polystyrene product. In each experiment the polymerization was carried out by heating the reaction mixture at temperatures between 100° and 105° C. for 120 hours. The polymer was purified and the molecular weight was determined as in Example 1.

Table II

| Run No. | Starting materials | | | Polymeric product | |
|---|---|---|---|---|---|
| | Styrene | Other ingredients | | Yield | Molecular weight |
| | | Kinds | Percent | | |
| | Percent | | | Percent | |
| 1 | 100 | None | 0 | ±99.0 | 127,000 |
| 2 | 75 | Mesityl oxide | 25 | 94.5 | 20,000 |
| 3 | 50 | Mesityl oxide | 50 | 92.0 | 20,000 |
| 4 | 50 | Mesityl oxide | 25 | } 92.0 | 16,000 |
| | | Toluene | 25 | | |
| 5 | 75 | Toluene | 25 | 88.5 | 82,000 |
| 6 | 50 | Toluene | 50 | 84.0 | 39,000 |
| 7 | 75 | Ethylbenzene | 25 | 92.0 | 63,000 |
| 8 | 75 | Chlorobenzene | 25 | 90.6 | 101,000 |

From a comparison of runs 2–4 with the other runs of the table it will be seen that mesityl oxide is exceptionally effective in suppressing the molecular weight of the polymer formed by polymerizing styrene in its presence. That this effect is catalytic is evidenced by the showing in runs 2 and 3 that the molecular weight of the polymer product was about the same even though the proportional mesityl oxide was doubled and also by the showing in run 4 that the molecular weight was further depressed only slightly by having toluene as well as the mesityl oxide present during the polymerization. Runs 4–8 illustrate the results obtained with usual organic diluents and are submitted for purpose of comparison with the runs 2–4, which illustrate the results obtained by polymerizing styrene in the presence of mesityl oxide.

EXAMPLE 3

In each of two experiments an emulsion was prepared by mixing one part by weight of a styrene-containing organic liquid with 2.5 parts of an aqueous solution which contained Nopco (i. e. a sodium salt of sulphonated sperm oil) in amount corresponding to two per cent of the weight of the styrene-containing organic liquid and hydrogen peroxide in amount corresponding to 0.1 per cent of the weight of the styrene-containing organic liquid. Each mixture was agitated to effect emulsification and was treated with sufficient nitric acid to give the emulsion a pH value of 2. The distinction between the emulsions was that in one of the experiments the "styrene-containing organic liquid" used in preparing the emulsion was styrene alone whereas in the other experiment it was a solution of styrene and mesityl oxide which contained 25 per cent by weight of the latter. The emulsions were each heated at a temperature of 90° C. for two hours, after which the resultant polystyrene product was precipitated by adding to each emulsion three parts by volume of ethyl alcohol and boiling the mixture. In each instance the precipitated polystyrene was separated by filtration, washed with alcohol, dried, weighed, and the molecular weight was determined as in Example 1. Table III identifies the styrene-containing organic liquid employed as a starting material in each experiment and gives the per cent yield of polystyrene based on the styrene initially employed and the molecular weight of the polystyrene product.

*Table III*

| Run No. | Styrene-containing organic liquid | | Polystyrene product | |
|---|---|---|---|---|
| | Styrene | Mesityl oxide | Yield | Molecular weight |
| | Per cent | Per cent | Per cent | |
| 1 | 100 | 0 | 100 | 139,000 |
| 2 | 75 | 25 | 88 | 49,500 |

Other modes of applying the principle of the invention may be employed instead of those explained change being made as regards the method herein disclosed, provided the step or steps stated by any of the following claims or the equivalent of such stated step or steps be employed.

We therefore particularly point out and distinctly claim as our invention:

1. In a method wherein a polymerizable organic liquid comprising a vinyl aromatic compound is polymerized, the step which consists in carrying out the polymerization in the presence of mesityl oxide, whereby a polymeric product is formed which is of lower molecular weight than is obtainable when the polymerization is carried out in the absence of mesityl oxide under otherwise similar conditions.

2. The method which comprises polymerizing a vinyl aromatic compound in the presence of mesityl oxide, whereby a polymer is formed which is of lower molecular weight than is obtainable by carrying out the polymerization in the absence of mesityl oxide under otherwise similar conditions.

3. In a method wherein a polymerizable organic liquid comprising styrene is polymerized, the step which consists in carrying out the polymerization in the presence of mesityl oxide, whereby a polymeric product is formed which is of lower molecular weight than is obtainable by carrying out the polymerization in the absence of mesityl oxide under otherwise similar conditions.

4. The method which comprises polymerizing styrene in the presence of mesityl oxide, whereby a polymer is formed which is of lower molecular weight than is obtainable by polymerizing the styrene in the absence of mesityl oxide under otherwise similar conditions.

5. The method which comprises polymerizing a vinyl aromatic compound in the presence of mesityl oxide in amount corresponding to between 0.5 and 60 per cent of the combined weight of the vinyl aromatic compound and the mesityl oxide.

6. The method which comprises polymerizing a vinyl aromatic compound at temperatures between 70° and 170° C. in the presence of mesityl oxide in amount corresponding to between 10 and 50 per cent of the combined weight of the vinyl aromatic compound and the mesityl oxide.

7. The method which comprises polymerizing styrene in the presence of mesityl oxide in amount corresponding to between 0.5 and 50 per cent of the combined weight of the styrene and mesityl oxide.

8. The method which comprises polymerizing styrene at temperatures between 70° and 170° C. in the presence of mesityl oxide in amount corresponding to between 10 and 50 per cent of the combined weight of the styrene and the mesityl oxide.

9. The method which comprises polymerizing a vinyl aromatic compound while in an aqueous emulsion thereof which also contains mesityl oxide.

10. The method which comprises polymerizing styrene while in an aqueous emulsion thereof which also contains mesityl oxide.

EDGAR C. BRITTON.
WALTER J. LE FEVRE.